United States Patent
Lee et al.

(10) Patent No.: US 12,453,699 B2
(45) Date of Patent: Oct. 28, 2025

(54) GAS-GENERATING MICELLE FOR REDUCING LOCALIZED FAT

(71) Applicant: SUPERNOVA BIO CO., LTD., Seoul (KR)

(72) Inventors: Kuen Yong Lee, Seoul (KR); Choong Gu Kim, Incheon (KR)

(73) Assignee: SUPERNOVA BIO CO., LTD., Seoul (KR)

( * ) Notice: Subject to any disclaimer, the term of this patent is extended or adjusted under 35 U.S.C. 154(b) by 81 days.

(21) Appl. No.: 17/758,877

(22) PCT Filed: Dec. 28, 2020

(86) PCT No.: PCT/KR2020/019197
§ 371 (c)(1),
(2) Date: Jul. 14, 2022

(87) PCT Pub. No.: WO2021/145586
PCT Pub. Date: Jul. 22, 2021

(65) Prior Publication Data
US 2023/0096668 A1 Mar. 30, 2023

(30) Foreign Application Priority Data
Jan. 15, 2020 (KR) .................. 10-2020-0005470

(51) Int. Cl.
| | |
|---|---|
| A61K 9/107 | (2006.01) |
| A61K 8/02 | (2006.01) |
| A61K 8/19 | (2006.01) |
| A61K 8/64 | (2006.01) |
| A61K 8/86 | (2006.01) |
| A61K 47/10 | (2017.01) |
| A61K 47/34 | (2017.01) |
| A61P 3/04 | (2006.01) |

(52) U.S. Cl.
CPC ............ *A61K 9/107* (2013.01); *A61K 8/0291* (2013.01); *A61K 8/19* (2013.01); *A61K 8/64* (2013.01); *A61K 8/86* (2013.01); *A61K 47/10* (2013.01); *A61K 47/34* (2013.01); *A61P 3/04* (2018.01)

(58) Field of Classification Search
CPC ........ A61K 9/107; A61K 8/0291; A61K 8/64; A61K 8/86; A61K 47/10; A61K 47/34; A61K 9/0019; A61K 9/1075; A61K 38/00; A61K 2800/91; A61K 33/00; A61K 47/60; A61K 47/62; A61K 47/645; A61K 47/6907; A61P 3/04
See application file for complete search history.

(56) References Cited

U.S. PATENT DOCUMENTS

| | | | |
|---|---|---|---|
| 9,029,321 B2 | 5/2015 | Kolonin et al. | |
| 2010/0221320 A1 | 9/2010 | Kato et al. | |
| 2015/0359751 A1 | 12/2015 | Lee et al. | |
| 2018/0280548 A1* | 10/2018 | Lee | A61K 49/227 |
| 2018/0326080 A1 | 11/2018 | Deng et al. | |
| 2021/0161917 A1 | 6/2021 | Kim et al. | |
| 2023/0173099 A1* | 6/2023 | Jeong | A61K 9/0019 |
| | | | 424/40 |

FOREIGN PATENT DOCUMENTS

| | | |
|---|---|---|
| EP | 2987504 | 2/2016 |
| JP | 2014-510758 | 5/2014 |
| KR | 10-0772961 | 11/2007 |
| KR | 10-2011-0075054 | 7/2011 |
| KR | 10-2011-0119640 | 11/2011 |
| KR | 10-2013-0067158 | 6/2013 |
| KR | 10-2013-0079244 | 7/2013 |
| KR | 10-1494193 | 2/2015 |
| KR | 10-2018-0107745 | 10/2018 |
| KR | 10-2112702 | 5/2020 |
| WO | WO 2010/075438 | 7/2010 |
| WO | WO 2012/135729 | 10/2012 |
| WO | WO 2021/125488 | 6/2021 |

OTHER PUBLICATIONS

Lee et al., "Gas-forming poly(ethylene glycol)-b -poly(L-lactic acid) micelles," Polym Adv Tech. (2013) 24(6); 551-556.
U.S. Appl. No. 17/787,274, filed Jun. 17, 2022, by Jeong et al.
Bauknight et al., "Importance of thorough tissue and cellular level characterization of targeted drugs in the evaluation of pharmacodynamic effects," PLoS One. (2019) 14(11):e0224917.
Ping et al., Dietary Guidelines for Infants and Children and Adolescents, China Medical Science and Technology Press, 1st edition, Feb. 27, 2023, p. 231. (Article in Chinese) English summary provided.
Sun et al., "Advance on the research of cell-penetrating peptides," Chinese Pharmaceutical Journal. (2013) (24):1143-1147. (Article in Chinese) English abstract provided.

* cited by examiner

*Primary Examiner* — Robert A Wax
*Assistant Examiner* — John Seungjai Kwon
(74) *Attorney, Agent, or Firm* — Morrison & Foerster LLP

(57) ABSTRACT

The present invention relates to a gas-generating micelle for reducing localized fat. In the present invention, by forming a micelle using a material having high biocompatibility and also introducing a cell-targeting ligand (peptide) onto the surface of the micelle, delivery to surrounding cells and tissues other than adipocytes can be minimized, and delivery into adipocytes can be maximized. The gas-generating micelle for reducing localized fat according to the present invention can be produced as an injectable preparation, and can be applied to local lipolysis supplements or diet beauty products that break down localized fat.

8 Claims, 12 Drawing Sheets

[FIG. 1]
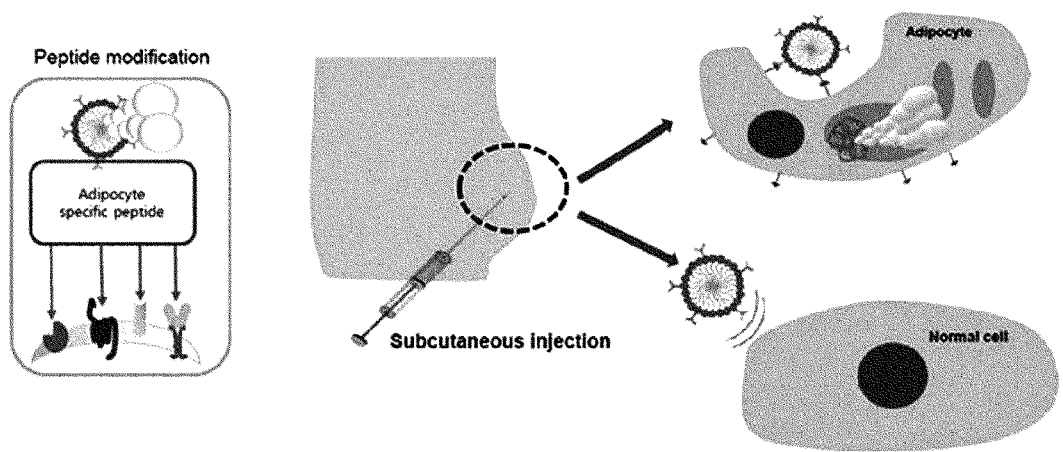

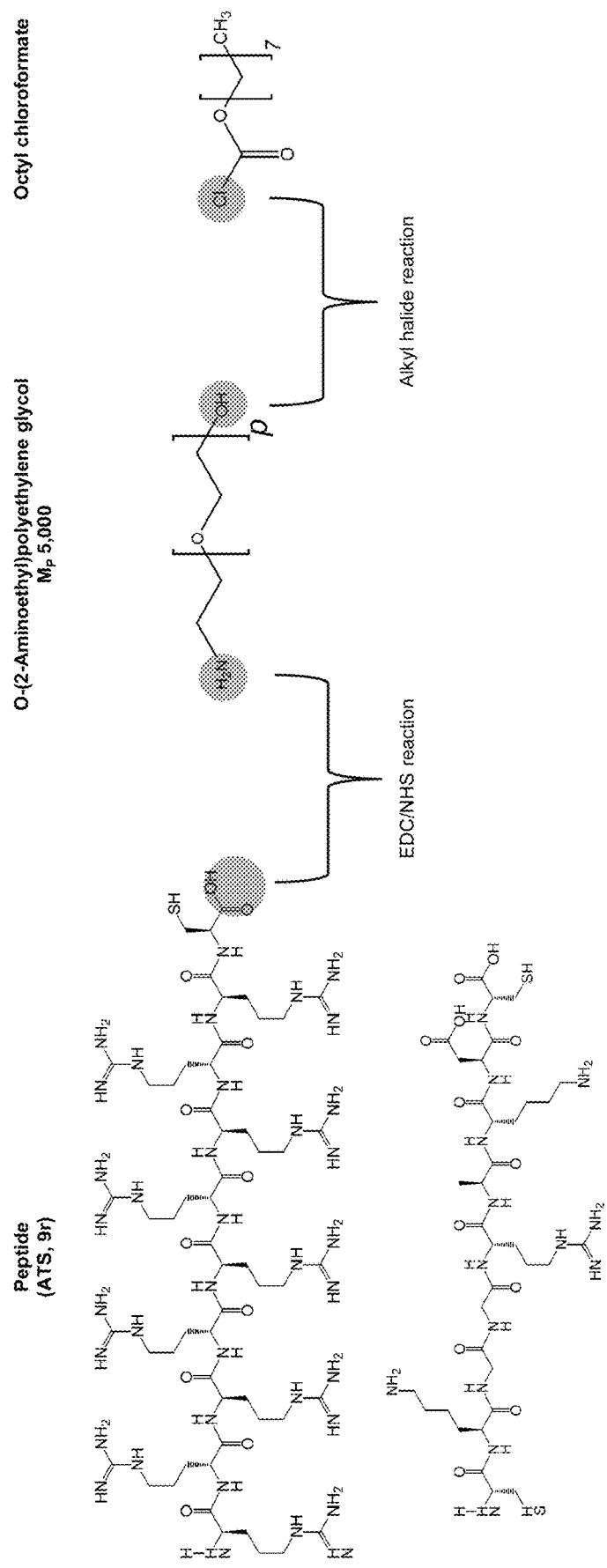
[FIG. 2]

[FIG. 3]
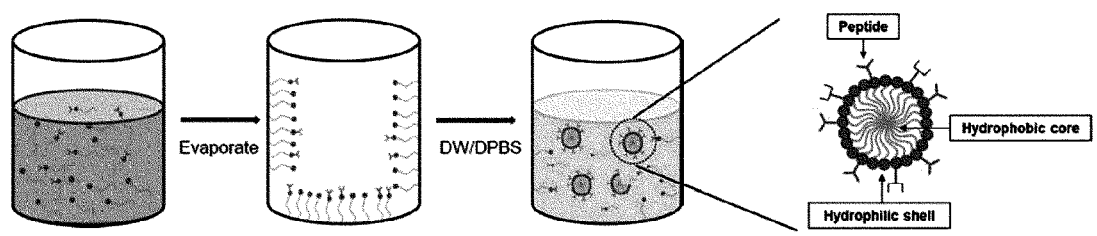

[FIG. 4]
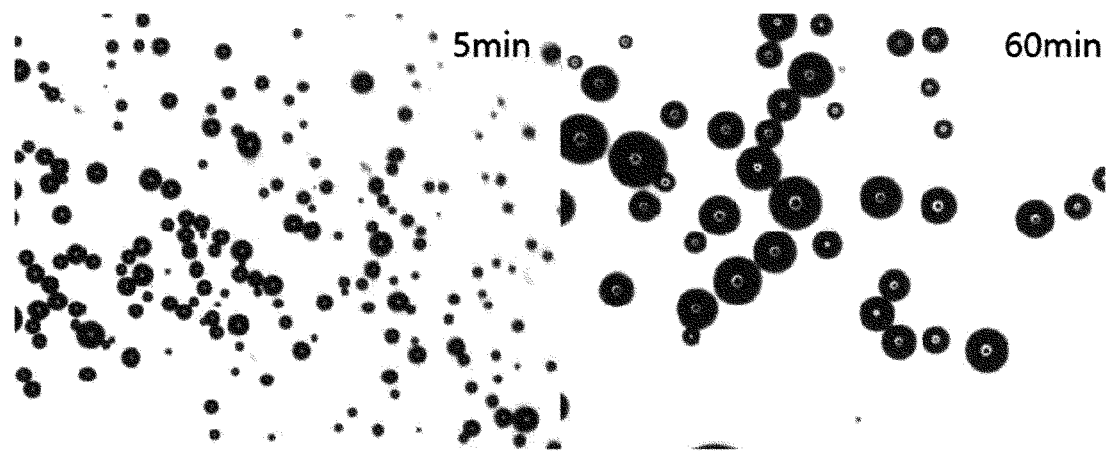

[FIG. 5]
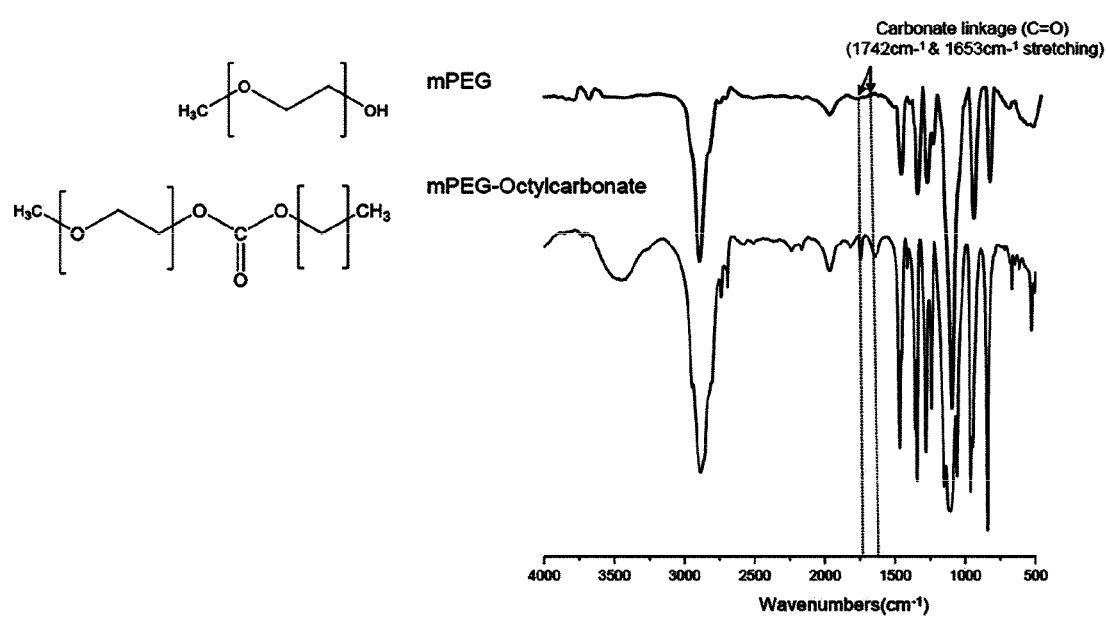

[FIG. 6]
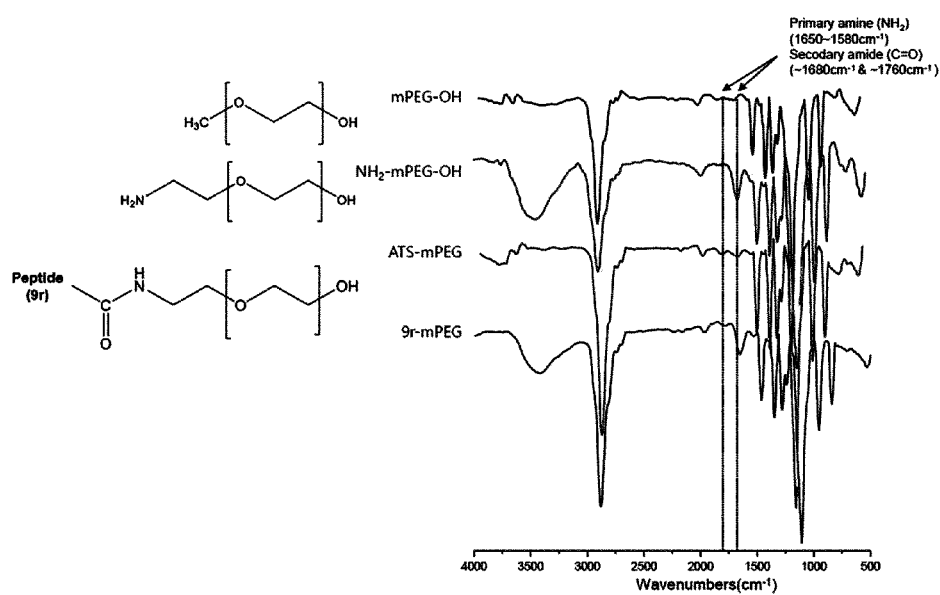

[FIG. 7]
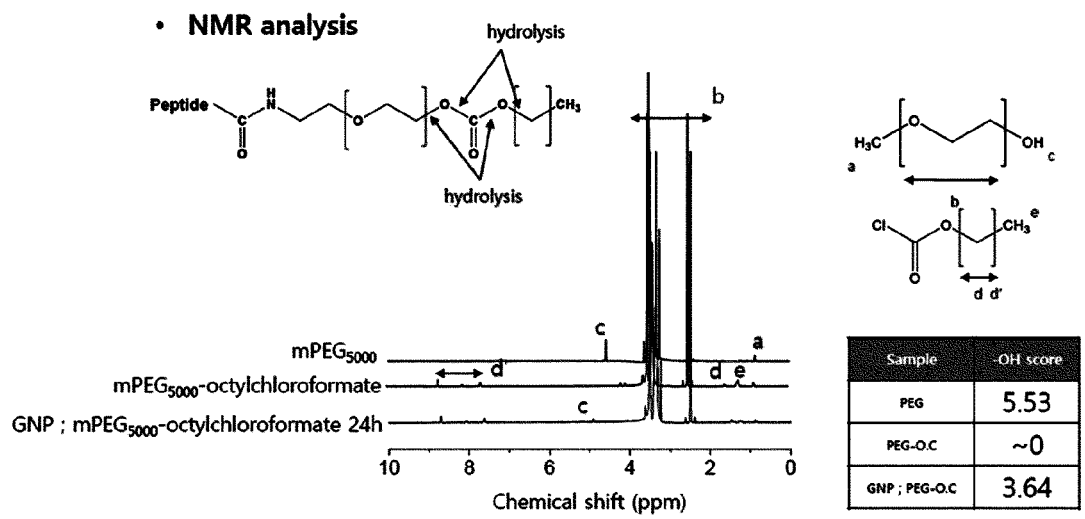
[FIG. 8]
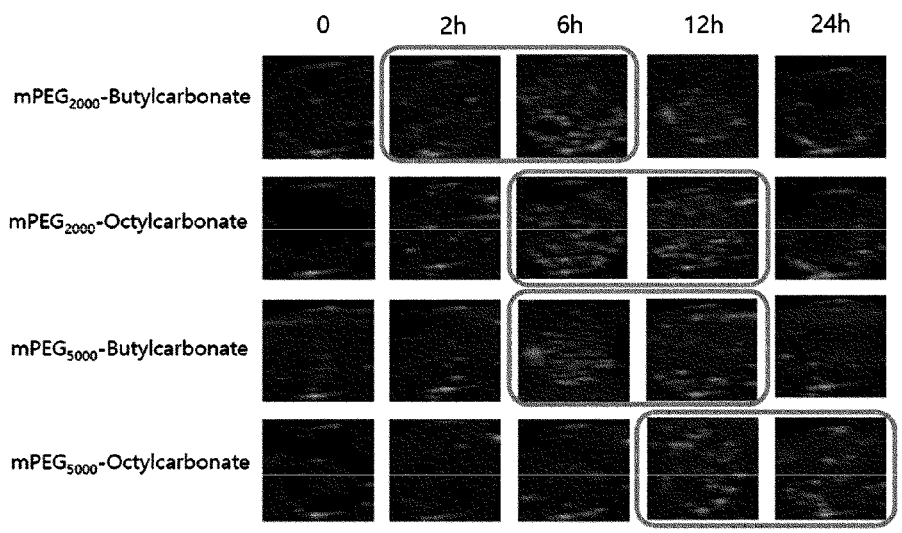

[FIG. 9]
- Time-laps optical image of GNP(mPEG$_{5000}$-octylchloroformate)
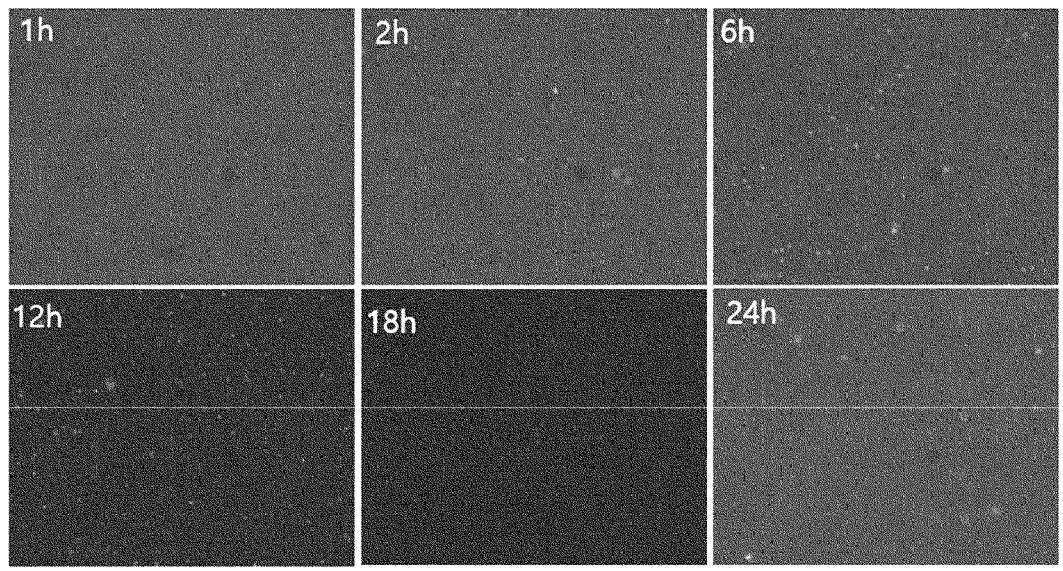

[FIG. 10]
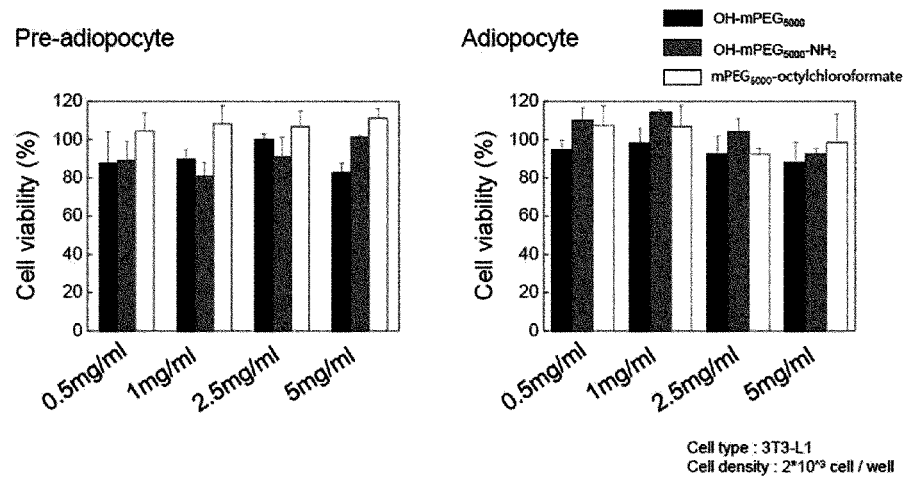

[FIG. 11]
3t3-l1
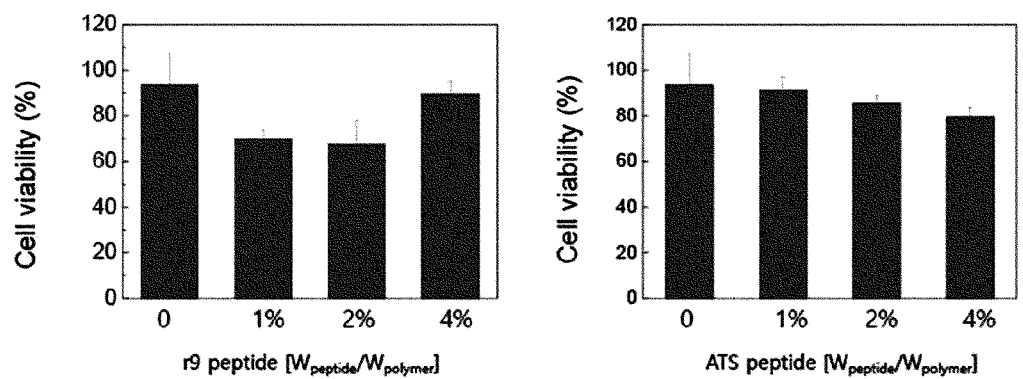

[FIG. 12]
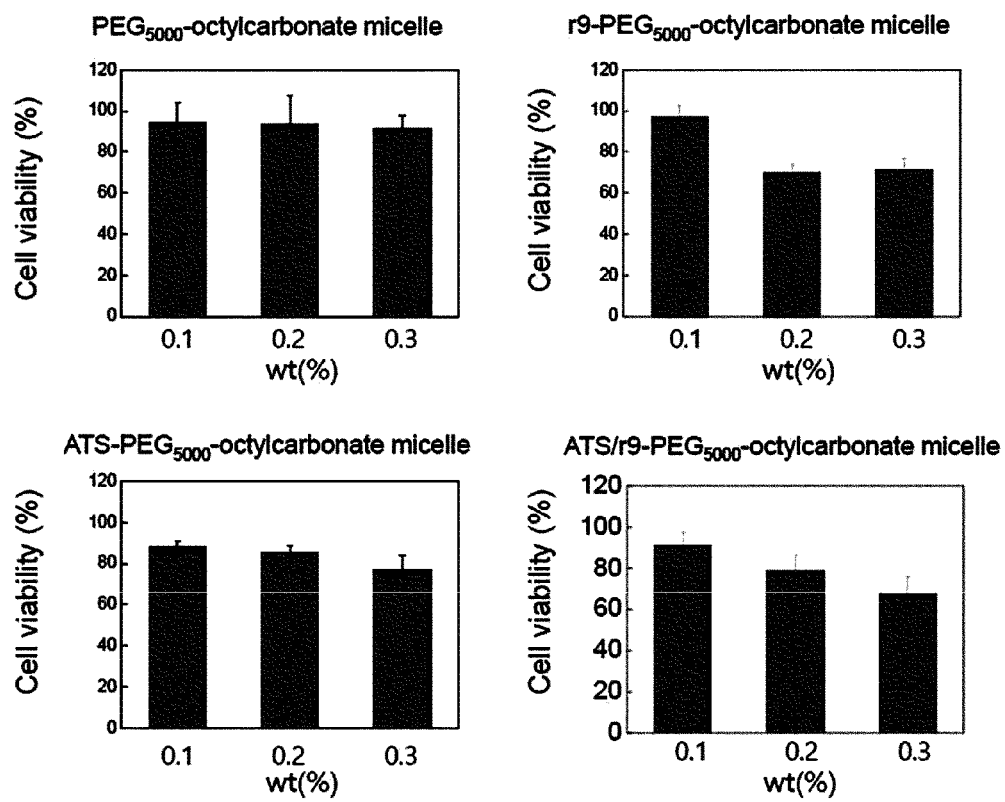

[FIG. 13]
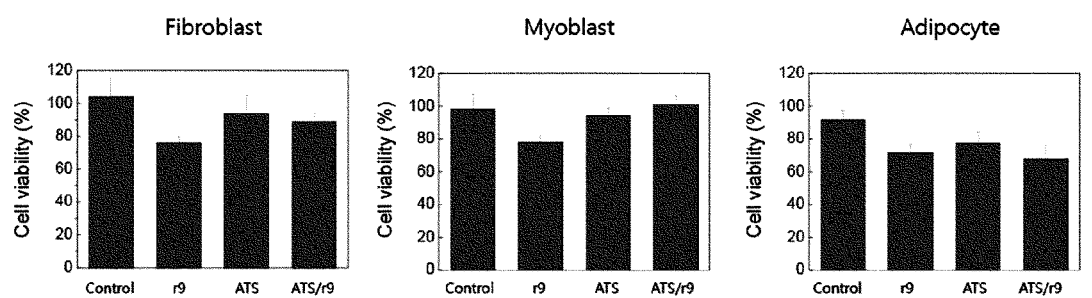

GAS-GENERATING MICELLE FOR REDUCING LOCALIZED FAT

CROSS REFERENCE TO RELATED APPLICATIONS

This application is a national stage application under 35 U.S.C. § 371 of International Application No. PCT/KR2020/019197, filed internationally on Dec. 28, 2020, which claims priority to and the benefit of Korean Patent Application No. 10-2020-0005470, filed Jan. 15, 2020, the disclosures of which are incorporated herein by reference in their entireties for all purposes.

TECHNICAL FIELD

The present invention relates to a gas-generating micelle for reducing localized fat.

BACKGROUND ART

The reduction of subcutaneous fat existing under the epidermis and dermis of the skin is one of the most important cosmetic procedures, and various surgical methods are used for the purpose of such cosmetic procedure.

Examples of procedures to reduce subcutaneous fat include a liposuction in which a cannula is inserted into the subcutaneous fat to suck out fat, a freezing procedure in which a cooling pad is attached to the skin surface to cool and necrosis the subcutaneous fat, a thermal heating procedure that removes the subcutaneous fat by irradiating high-frequency or ultrasonic waves to the subcutaneous tissue and heating, a carboxytherapy procedure that removes fat by gradually injecting carbon dioxide ($CO_2$) into the subcutaneous fat with an injection needle to promote blood flow and lymph circulation in adipose tissue, and a mesotherapy procedure that injects drugs for obesity treatment into the subcutaneous fat.

The liposuction, which is known to be the most effective among the procedures, has disadvantages in the pain accompanied during the procedure and future management. Typically, there is bleeding during the liposuction and pain accompanied during the procedure. This can cause pain even after the procedure, so it may be necessary to take painkillers depending on an individual. In addition, compression garments must be worn for at least a week after the suction operation, and management is required for about a month after the procedure.

In addition, the freezing procedure is simple, but has a disadvantage in that the procedure effect is low. In Korean Patent Laid-Open No. 10-2011-0119640, an invasive procedure in which a probe cooled by circulating a refrigerant inside is inserted into the subcutaneous fat was used. However, when the invasive cooling procedure is used, although the procedure time is shortened compared to the non-invasive cooling procedure, it has a disadvantage in that it requires a considerably long procedure time to prevent necrosis of the subcutaneous fat due to cooling.

On the other hand, the carboxytherapy is a procedure that intensively treats an area where fat is excessively accumulated. In Korean Patent Registration No. 10-0772961, the mesotherapy procedure and the carboxytherapy procedure were performed parametrically to increase fat removal efficiency. However, in the patent, since a separate syringe needle is used for each procedure, there is a problem in that the internal structure is complicated and a separate incision is made for each needle.

Currently, supplements for reducing localized fat, which have been approved by the Ministry of Food and Drug Safety, has very limited uses, and off-label procedures are frequently performed in the market today. These off-label procedures lack the basis for safety and effectiveness, and because the procedural fees are non-reimbursable, they are in the blind spot of safe use management, and the institutional management for them is insufficient.

Belkyra, a drug approved as a lipolysis supplement, causes apoptosis of adipocytes by destroying the cell membrane of localized fat. However, Belkyra has the disadvantage that it can be used only for double chin surgery. In addition, since these drugs non-specifically destroy the cell membrane, it is reported that the current risk of breast cancer or colorectal cancer increases because it has a large effect on the surrounding cells as well as the adipocytes, and may have adverse effects on the surrounding tissues.

DISCLOSURE

Technical Problem

In order to solve the above problems, the present invention is to provide a supplement for decomposing localized fat or cosmetic product for weight loss that can be manufactured as an injectable formulation and that decomposes localized fat.

Technical Solution

The present invention provides a gas-generating micelle for reducing fat, including a compound represented by the following Chemical Formula 1, wherein adipocyte is destroyed by carbon dioxide generated by hydrolysis of the compound.

[Chemical Formula 1]

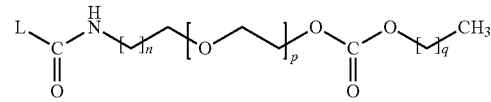

In the Chemical Formula 1, p is an integer of 12 to 227, q is an integer of 2 to 14, n is an integer of 0 to 5, and L is an adipocyte-targeting sequence (ATS) peptide or r9 (arginine) peptide.

In addition, the present invention provides a method for preparing a gas-generating micelle for reducing fat including a compound represented by the following Chemical Formula 1. The method includes the steps of synthesizing a polyethylene glycol derivative that is a compound represented by Chemical Formula 4 by mixing polyethylene glycol and alkyl chloroformate; synthesizing a peptide-bound polyethylene glycol derivative by binding one or more peptides selected from the group consisting of an adipocyte-targeting sequence (ATS) peptide and an r9 (arginine) peptide to the polyethylene glycol derivative; and synthesizing a micelle by evaporating a solvent after dissolving the polyethylene glycol derivative and the peptide-bound polyethylene glycol derivative in one or two or more mixture solvents selected from acetonitrile, methylene chloride, chloroform and methanol.

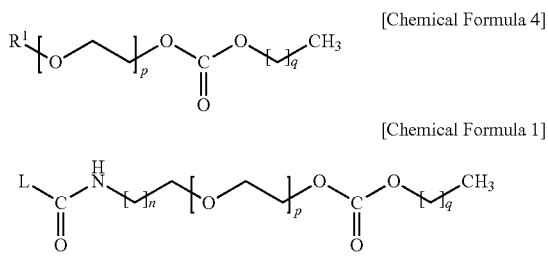

[Chemical Formula 4]

[Chemical Formula 1]

In the Chemical Formula 1 or 4, $R^1$ is a hydrogen, a C1 to C5 alkyl group, an amine group, a C1 to C5 alkylamine group, a carboxyl group, or a C1 to C5 alkylcarboxyl group, p is an integer of 12 to 227, q is an integer of 2 to 14, n is an integer of 0 to 3, and L is an adipocyte-targeting sequence (ATS) peptide or r9 (arginine) peptide.

In addition, the present invention provides a composition for reducing fat including the above described gas-generating micelle for reducing fat.

Advantageous Effect

The gas-generating micelle for reducing fat according to the present invention is locally administered and deposited on adipocytes to generate carbon dioxide, thereby decomposing fat through apoptosis of adipocytes. In particular, in the present invention, since targeting to adipocytes is possible using a ligand (peptide), the effect on surrounding tissues and cells can be minimized, and by doing so, the product having minimized side effects due to the drug and enabling safer procedure can be developed. The micelle is generally applicable to areas such as the chin, thigh, arm, and stomach, which are frequently treated.

In addition, the gas-generating micelle for reducing fat according to the present invention can be prepared as an injectable formulation, and is applied to the cosmetic field for weight loss and the obesity treatment field, so that it can be used as a supplement for decomposing localized fat, a body shape corrective or a cosmetic product for weight loss that decomposes localized fat through the apoptosis of the localized fat.

DESCRIPTION OF DRAWINGS

FIG. 1 is a schematic diagram showing fat reduction by the accumulation of a gas-generating micelle according to an embodiment of the present invention in adipocytes and gas generation.

FIG. 2 is a schematic diagram showing the binding of polyethylene glycol alkyl carbonate and peptide.

FIG. 3 is a schematic diagram showing a preparation process of a gas-generating micelle according to an embodiment of the present invention.

FIG. 4 is a photograph of air bubbles (gas) generated in a micelle prepared according to an embodiment of the present invention.

FIG. 5 is a graph showing the FT-IR analysis of polyethylene glycol alkyl carbonate prepared according to an embodiment of the present invention.

FIG. 6 is a graph showing the FT-IR analysis of peptide-introduced polyethylene glycol alkyl carbonate prepared according to an embodiment of the present invention.

FIG. 7 is a graph showing the gas generation result of peptide-introduced polyethylene glycol alkyl carbonate prepared according to an embodiment of the present invention, confirmed by NMR.

FIG. 8 is a photograph showing the result of measuring the gas generation rate of polyethylene glycol alkyl carbonate prepared according to an embodiment of the present invention.

FIG. 9 shows an optical microscope image of observing the gas generation from polyethylene glycol alkyl carbonate prepared according to an embodiment of the present invention.

FIG. 10 is a graph showing the cytotoxicity evaluation result of polyethylene glycol alkyl carbonate prepared according to an embodiment of the present invention.

FIG. 11 is a graph showing the evaluation result of apoptosis effect of adipocyte by a gas-generating micelle prepared according to an embodiment of the present invention according to an amount of peptide introduced.

FIG. 12 is a graph showing the evaluation result of apoptosis effect of adipocyte according to a micelle concentration and a peptide combination.

FIG. 13 is a graph showing the evaluation result of apoptosis effect of cells other than adipocyte of a gas-generating micelle prepared according to an embodiment of the present invention.

MODE FOR INVENTION

The present invention relates to a gas-generating micelle for reducing fat including a compound represented by the following Chemical Formula 1, wherein adipocytes are destroyed by carbon dioxide generated by hydrolysis of the compound.

[Chemical Formula 1]

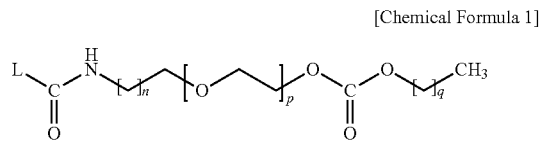

In the present invention, a micelle is formed using a material with high biocompatibility, and a peptide, that is, a cell-targeting ligand, is introduced on the surface of the micelle, so that delivery to surrounding cells and tissues other than adipocytes can be minimized and the delivery into adipocytes is maximized. Through this, it can be used as a lipolysis supplement that minimizes the side effects of conventional products. In addition, since it induces cell damage by using a gas (e.g., carbon dioxide) that is harmless to the human body, safety can be improved compared to other chemical formulations.

Hereinafter, the gas-generating micelle for fat reduction of the present invention will be described in more detail.

The gas-generating micelle for fat reduction of the present invention (hereinafter, referred to as gas-generating micelle or micelle) includes a compound represented by the following Chemical Formula 1 (hereinafter, expressed as a compound of Chemical Formula 1).

[Chemical Formula 1]

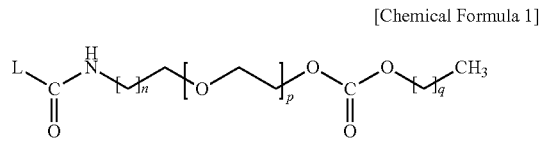

In Chemical Formula 1, p may be an integer of 12 to 227, q may be an integer of 2 to 14, n may be an integer of 0 to 5, L may be an adipocyte-targeting sequence (ATS) peptide or an r9 (arginine) peptide.

In one embodiment, q may be an integer of 4 to 10, an integer of 4 to 8, an integer of 6 to 10, or an integer of 8 to 10, and n may be an integer of 1 to 3.

In one embodiment, the molecular weight of the compound of Chemical Formula 1 is 550 to 10,000 Da (g/mol), 1,000 to 10,000 Da, 2,000 to 6,000 Da, 1,500 to 3,000 Da, 2,000 to 2,500 Da, 4,500 to 6,000 Da, or 5,000 to 5,500 Da.

In one embodiment, the diameter of the micelle may be 150 to 500 nm, or 200 to 400 nm. If the diameter is small, the desired effect of apoptosis cannot be obtained, and if the diameter is too large, it is not suitable for injection into the body, so it is preferable to adjust the diameter within the above range.

In the present invention, the term 'micelle' generally refers to a compound having a spherical structure formed of low molecular weight substances having an amphiphilic property, for example, a hydrophilic group and a hydrophobic group at the same time. The micelle has a thermodynamically stable property. When an non-aqueous (hydrophobic) drug is dissolved in the compound having the micelle structure and injected, the drug is present inside the micelle.

The micelle of the present invention includes a compound in which an alkyl chloroformate is conjugated with a hydroxyl group of polyethylene glycol to form a carbonate group. In the present invention, the compound can be expressed as a derivative below.

Specifically, the micelle has a carbonate bond between the alkyl chloroformate present on the hydrophobic core and the hydrophilic polyethylene glycol located on the surface (or shell). Accordingly, in the derivative, the alkyl chloroformate moiety is located inside the micelle, and the polyethylene glycol moiety is located on the surface.

In addition, the micelle of the present invention has a structure in which a peptide is bound to the surface of the micelle. The peptide is a targeting ligand, and may be at least one peptide selected from an adipocyte-targeting sequence (ATS) peptide and an r9 (arginine) peptide. The peptide may form a strong bond by binding to the end portion of the polyethylene glycol present on the surface of micelle. In one embodiment, the carboxyl group of the peptide and the terminal amine group of the polyethylene glycol may form a bond. According to the characteristics of the peptide, the micelle of the present invention may have target orientation. As used herein, the term 'ligand' refers to a molecule that binds to a ligand-binding protein and causes a structural change. The ligand may be at least one selected from an adipocyte-targeting sequence (ATS) peptide and an r9 (arginine) peptide. Through the adipocyte-targeting sequence (ATS) peptide, the target rate for adipocytes, particularly white fat, can be improved, and the cell permeability can be improved through the r9 (arginine) peptide.

In one embodiment, the compound of Chemical Formula 1 contained in the micelle of the present invention may be a compound represented by the following Chemical Formula 2 (hereinafter, expressed as a compound of Chemical Formula 2). In addition, the compound of Chemical Formula 1 may be a compound represented by the following Chemical Formula 3 (hereinafter, represented as a compound of Chemical Formula 3). The compound of Chemical Formula 2 is a compound to which an adipocyte-targeting sequence (ATS) peptide is bound, and the compound of Chemical Formula 3 is a compound to which an r9 (arginine) peptide is bound.

[Chemical Formula 2]

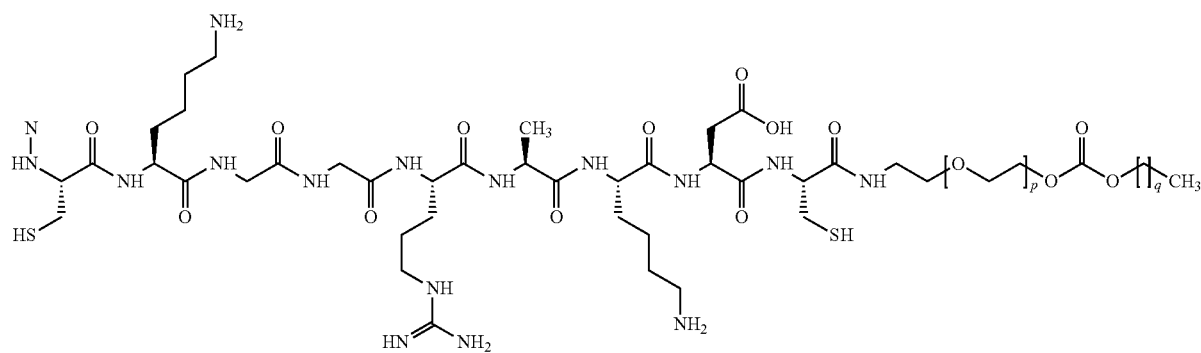

[Chemical Formula 3]

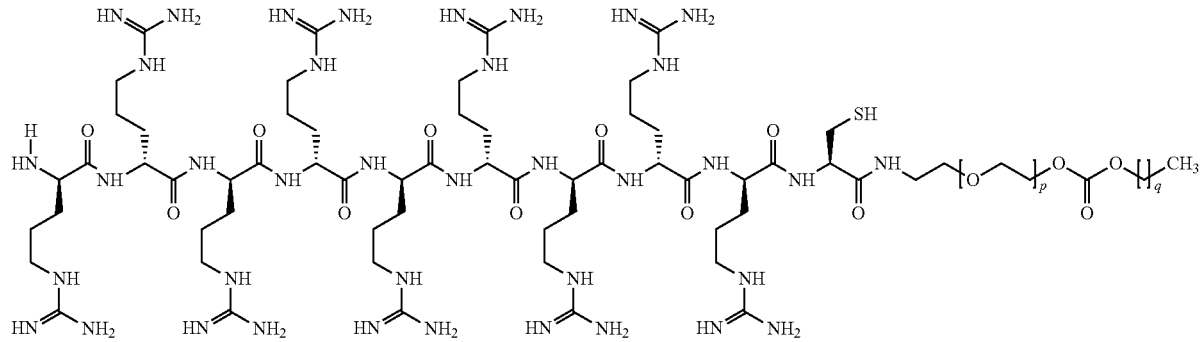

In Chemical Formulas 2 to 3, p and q may be the same as p and q in Chemical Formula 1.

In one embodiment, the micelle may further include a compound represented by Chemical Formula 4 (hereinafter, a compound of Chemical Formula 4) in addition to the compound represented by Chemical Formula 1.

[Chemical Formula 4]

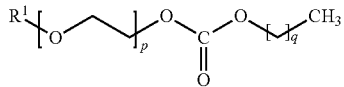

In Chemical Formula 4, $R^1$ may be a hydrogen, a C1 to C5 alkyl group, an amine group, a C1 to C5 alkylamine group, a carboxyl group, or a C1 to C5 alkylcarboxyl group, and p and q may be the same as p and q in Chemical Formula 1.

In addition, the present invention relates to a method for preparing the above-described gas-generating micelle for reducing fat.

The gas-generating micelle for reducing fat according to the present invention can be prepared by the steps of synthesizing a polyethylene glycol derivative that is a compound represented by Chemical Formula 4 by mixing polyethylene glycol and alkyl chloroformate; synthesizing a peptide-bound polyethylene glycol derivative by binding at least one peptide selected from the group consisting of an adipocyte-targeting sequence (ATS) peptide and an r9 (arginine) peptide to the polyethylene glycol derivative; and synthesizing a micelle by evaporating a solvent after dissolving the polyethylene glycol derivative and the peptide-bound polyethylene glycol derivative in one or two or more mixture solvents selected from acetonitrile, methylene chloride, chloroform and methanol.

[Chemical Formula 4]

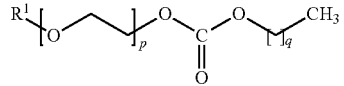

[Chemical Formula 1]

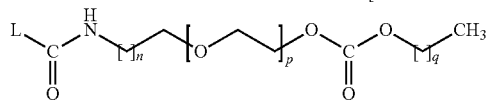

In Chemical Formula 1 or 4, $R^1$ is a hydrogen, a C1 to C5 alkyl group, an amine group, a C1 to C5 alkylamine group, a carboxyl group, or a C1 to C5 alkylcarboxyl group, p is an integer of 12 to 227, q is an integer of 2 to 14, n is an integer of 0 to 5, L is an adipocyte-targeting sequence (ATS) peptide or R9 (arginine) peptide.

In one embodiment, in the compound, q may be an integer of 4 to 10, an integer of 4 to 8, an integer of 6 to 10, or an integer of 8 to 10, and n may be an integer of 1 to 3. Hereinafter, the preparation method of the gas-generating micelle of the present invention will be described in detail (FIGS. 2 and 3).

1. Synthesis of Polyethylene Glycol Derivative

Prior to preparing the micelle, polyethylene glycol derivative for forming the micelle is first prepared.

First, a polyethylene glycol solution and an alkyl chloroformate solution are prepared by dissolving each of polyethylene glycol and alkyl chloroformate in acetonitrile. After adding the alkyl chloroformate solution to the prepared polyethylene glycol solution, it is stirred. Pyridine is added to the stirred mixture and then reacted to prepare polyethylene glycol-alkyl carbonate.

In one embodiment, the polyethylene glycol has, but is not limited to, a molecular weight of 550 to 10,000 Da (g/mol), 1,000 to 10,000 Da, 2,000 to 6,000 Da, 1,500 to 3,000 Da, 2,000 to 2,500 Da, 4,500 to 6,000 Da or 5,000 to 5,500 Da.

In one embodiment, the alkyl chloroformate may be an aliphatic compound, and may be a chloroformate having an alkyl group having 4 to 10 carbon atoms, 4 to 8 carbon atoms, 6 to 10 carbon atoms, or 8 to 10 carbon atoms. For example, butyl chloroformate, octyl chloroformate, or dodecyl chloroformate may be used as the alkyl chloroformate, but is not limited thereto.

In one embodiment, the polyethylene glycol solution may be prepared by dissolving 0.2 to 0.8 mmol of polyethylene glycol in 2 to 6 ml of acetonitrile, and the alkyl chloroformate solution may be prepared by dissolving 1 to 3 mmol of alkyl chloroformate in 3 to 7 ml of acetonitrile.

In one embodiment, after adding the alkyl chloroformate solution to the polyethylene glycol solution, stirring may be performed for 2 to 10 minutes, 3 to 8 minutes, 4 to 6 minutes, or 5 minutes.

In one embodiment, nitrogen gas may flow during the stirring. Since the reactant is vulnerable to moisture in the atmosphere, in the present invention, the reaction can be induced to be stably performed by flowing nitrogen gas with low reactivity.

In one embodiment, 1.5 to 3.5 mmol of pyridine is added to the stirred mixture, followed by reaction at 0 to 5° C. for 20 to 40 minutes, followed by reaction at room temperature for 24 hours to prepare a polyethylene glycol derivative.

Such polyethylene glycol derivative is polyethylene glycol-alkyl carbonate.

The synthesis of the polyethylene glycol derivative can be confirmed through FT-IR spectroscopy and NMR analysis.

2. Synthesis of Peptide-Introduced Polyethylene Glycol Derivative

The target orientation to adipocytes can be improved by introducing the peptide into the polyethylene glycol derivative prepared in 1 above.

By EDC/NHS reaction of a compound having an amino group and a peptide, the polyethylene glycol to which the peptide is bound is prepared.

In one embodiment, the compound having an amino group may be aminoethylene glycol, and the peptide may be one or more selected from the group consisting of an adipocyte-targeting sequence (ATS) peptide and an 19 (arginine) peptide.

In one embodiment, the molar ratio of the compound having an amino group and the peptide may be 1:0.1 to 1:10, or 1:0.5 to 1:3, and the polyethylene glycol derivative to which the peptide is bound through the EDC/NHS reaction can be prepared.

In one embodiment, after preparing the peptide-bound polyethylene glycol, it may be dialyzed, and impurities and unreacted substances may be removed through a filter.

The synthesis of the peptide-bound polyethylene glycol derivative can be confirmed through FT-IR spectroscopy and NMR analysis.

3. Preparation of Micellar Particle Using Solvent Evaporation

The polyethylene glycol derivative prepared in 1 above and the peptide-introduced polyethylene glycol derivative prepared in 2 above can be prepared in a micelle through solvent evaporation.

Specifically, the micelle can be prepared by dissolving the polyethylene glycol derivative and the peptide-introduced polyethylene glycol derivative in an organic solvent, performing solvent evaporation to volatilize the solvent, and then redispersing it in a hydrophilic solution.

In one embodiment, in the above step, one or more derivatives selected from the group consisting of the polyethylene glycol derivative into which an adipocyte targeting sequence (ATS) peptide that is the compound of Chemical Formula 2 is introduced, and the polyethylene glycol derivative into which an r9 (arginine) peptide that is the compound of Chemical Formula 3 is introduced, and the polyethylene glycol derivative that is the compound of Chemical Formula 4 are used to form the micelle.

In one embodiment, when the micelle is prepared using the compound of Chemical Formula 2 and the compound of Chemical Formula 4, the molar ratio of the compound of Chemical Formula 2 and the compound of Chemical Formula 4 may be 99.5:0.5 to 95.0:5.0, 99.5:0.5 to 96.0:4.0, 99.0:1.0 to 97.0:3.0 or 99.0:1.0 to 98.0:2.0.

In one embodiment, when the micelle is prepared using the compound of Chemical Formula 3 and the compound of Chemical Formula 4, the molar ratio of the compound of Chemical Formula 3 and the compound of Chemical Formula 4 may be 99.5:0.5 to 95.0:5.0, 99.5:0.5 to 96.0:4.0, 99.0:1.0 to 97.0:3.0 or 99.0:1.0 to 98.0:2.0.

Further, in one embodiment, when the micelle is prepared using the compound of Chemical Formula 2, the compound of Chemical Formula 3, and the compound of Chemical Formula 4, the molar ratio of the compound of Chemical Formula 2, the compound of Chemical Formula 3, and the compound of Chemical Formula 4 may be 99:0.5:0.5 to 90.0:5.0:5.0, 99:0.5:0.5 to 97.0:1.5:1.5 or 99.0:0.5:0.5 to 98.0:1.0:1.0.

In one embodiment, 5 to 15 mg of the polyethylene glycol derivative and the peptide-introduced polyethylene glycol derivative may be dissolved in an organic solvent. The organic solvent may be a commonly used organic solvent, for example, acetonitrile, methylene chloride, chloroform and methanol.

In addition, the organic solvent may be a mixture solvent of methylene chloride and acetonitrile, a mixture solvent of methylene chloride and chloroform, or a mixture solvent of methylene chloride and methanol.

The mixture solvent used in the present invention may have a ratio of methylene chloride to another solvent of 3 to 1:1 to 3.

In one embodiment, after dissolving the polyethylene glycol derivative and the peptide-introduced polyethylene glycol derivative in an organic solvent, a coating on a glass wall may be performed at 100 to 300 rpm, 150 to 200 rpm or 180 rpm and at 25 to 45° C., 30 to 40° C. or 37° C. for about 5 to 10 minutes in a vacuum using a concentrator. In the present invention, the coating is performed using a concentrator, so that it is possible to induce a uniform coating on the glass wall. In the case of the solvent evaporation method using nitrogen, since the solvent is evaporated manually, additional effort is required to constantly control the rotation speed and rotation angle, but in the present invention, the coating is performed using a concentrator, so that continuous and uniform coating can be conducted.

Also, in one embodiment, the hydrophilic solution may include PBS and distilled water.

In addition, the present invention relates to a composition for reducing fat including the above-described gas-generating micelle for fat reduction.

The gas-generating micelle for reducing fat according to the present invention includes a carbonate group in its structure, and under an aqueous condition, the carbonate group of the micelle is broken due to hydrolysis and causes a reaction to generate carbon dioxide gas. Therefore, the gas-generating micelle for reducing fat of the present invention is locally administered in the form of nanoparticle and deposited in the adipocytes to generate gas. The necrosis of adipocytes occurs through cell strike by the generated carbon dioxide, thereby reducing fat (FIG. 1).

After the micelle is endocytosed, the cell strike may be generated by controlling the structure of the gas-generating micelle, and controlling the amount and time of generation of carbon dioxide to be generated.

The composition for reducing fat according to the present invention may include the compound of Chemical Formula 1 described above.

In addition, the composition for reducing fat according to the present invention may include a gas-generating micelle including at least one compound selected from the group consisting of a compound of Chemical Formula 2 and a compound of Chemical Formula 3, and a compound of Chemical Formula 4 below.

[Chemical Formula 2]

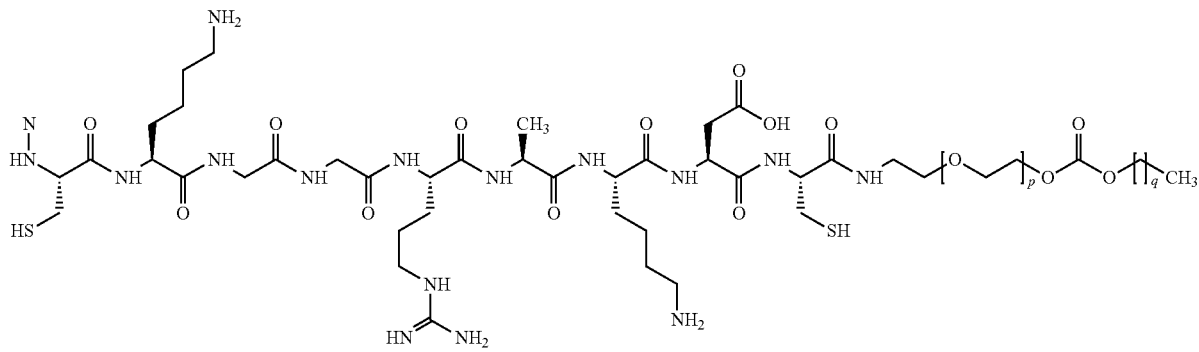

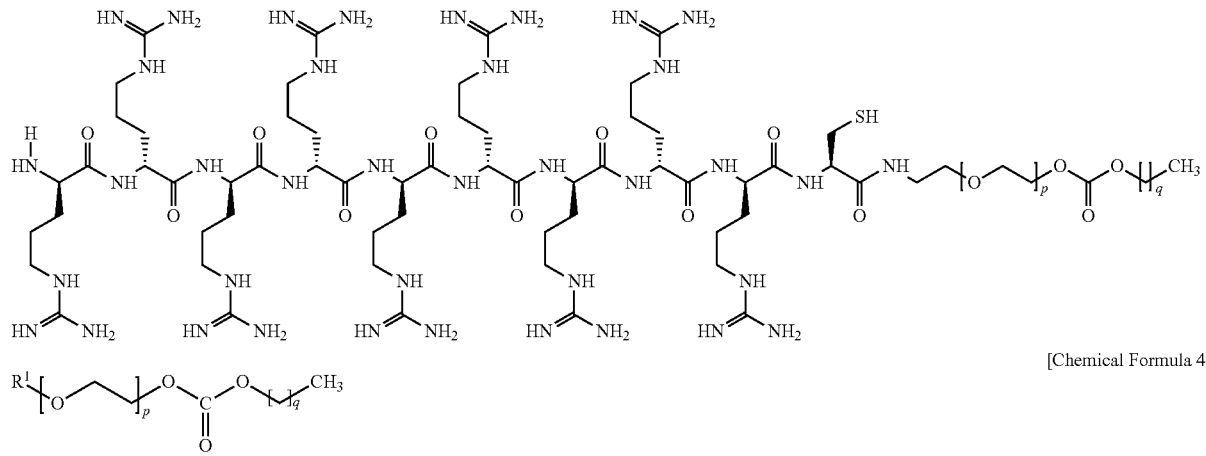

[Chemical Formula 3]

[Chemical Formula 4]

In Chemical Formula 2 to 4, $R^1$ is a hydrogen, a C1 to C3 alkyl group, an amine group, a C1 to C3 alkylamine group, a carboxyl group, or a C1 to C3 alkylcarboxyl group, P and q may be the same as p and q in the compound of Chemical Formula 1.

In one embodiment, when the composition for reducing fat includes the gas-generating micelle including the compound of Chemical Formula 2 and the compound of Chemical Formula 4, the molar ratio of the compound of Chemical Formula 2 and the compound of Chemical Formula 4 may be 99.5:0.5 to 95.0:5.0, 99.5:0.5 to 96.0:4.0, 99.0:1.0 to 97.0:3.0 or 99.0:1.0 to 98.0:2.0.

In one embodiment, when the composition for reducing fat includes the gas-generating micelle including the compound of Chemical Formula 3 and the compound of Chemical Formula 4, the molar ratio of the compound of Chemical Formula 3 and the compound of Chemical Formula 4 may be 99.5:0.5 to 95.0:5.0, 99.5:0.5 to 96.0:4.0, 99.0:1.0 to 97.0:3.0 or 99.0:1.0 to 98.0:2.0.

Further, in one embodiment, when the composition for reducing fat includes the gas-generating micelle including the compound of Chemical Formula 2, the compound of Chemical Formula 3, and the compound of Chemical Formula 4, the molar ratio of the compound of Chemical Formula 2, the compound of Chemical Formula 3, and the compound of Chemical Formula 4 may be 99:0.5:0.5 to 90.0:5.0:5.0, 99:0.5:0.5 to 97.0:1.5:1.5, or 99.0:0.5:0.5 to 98.0:1.0:1.0.

In one embodiment, the content of the gas-generating micelle in the composition for reducing fat may vary depending on the application site, etc., for example, may be 0.01 to 1.0 parts by weight or 0.1 to 0.5 parts by weight based on the total weight of the composition.

In one embodiment, the composition for reducing fat according to the present invention can be used for topical or intravenous injection, and is generally applicable to areas such as the chin, thigh, arm, and stomach, which are treated with a high frequency.

In one embodiment, the composition for reducing fat according to the present invention may be used as a supplement for decomposing localized fat, a body shape corrective, or a cosmetic product for weight loss.

Hereinafter, the present invention will be described in more detail through examples. These examples are only for illustrating the present invention in more detail, and it will be apparent to those skilled in the art that the scope of the present invention is not limited by these examples according to the gist of the present invention.

EMBODIMENTS

Example

<Reference>Experimental Materials

Polyethylene glycol was purchased from Sigma Aldrich and used. The number average molecular weight (Mn) of the usable polyethylene glycol is 550 to 20,000, and among them, the polyethylene glycol having a number average molecular weight of 5,000 is preferable for the production of a gas-generating micelle, and this was used in this experiment.

As the alkyl chloroformate, a chain aliphatic compound octyl chloroformate (Sigma Aldrich) was used.

Example 1. Preparation of a Gas-Generating Micelle (1) Synthesis of Polyethylene Glycol Derivative Polyethylene glycol and alkyl chloroformate were respectively dissolved in acetonitrile. Specifically, 0.5 mmol of polyethylene glycol was dissolved in 4 ml of acetonitrile to prepare a polyethylene glycol solution, and 2 mmol of alkyl chloroformate was added to 5 ml of acetonitrile to prepare an alkyl chloroformate solution.

After adding the alkyl chloroformate solution to the prepared polyethylene glycol solution, the mixture was stirred for 5 minutes. At the time of stirring, nitrogen gas with low reactivity was flowed. After adding 2.5 mmol of pyridine to the stirred mixture, the mixture was reacted at 0° C. for 30 minutes. After the reaction was completed, the synthesis was completed by stirring at room temperature for 24 hours.

The synthesized solution was precipitated in diethyl ether, filtered through a filter, and then dried in a vacuum dryer for 3 to 7 days to obtain a synthetic polymer, a polyethylene glycol derivative, that is, polyethylene glycol-alkyl carbonate.

Depending on the number average molecular weight of the polyethylene glycol and the type of alkyl of the alkyl chloroformate, other type of polyethylene glycol derivative, that is, polyethylene glycol-alkyl carbonate may be prepared. For example, when the number average molecular weight of polyethylene glycol is 5000 and octyl chloroformate is used, polyethylene glycol 5000-octyl carbonate is prepared, which can be expressed as PEG 5000-octylcarbonate.

FIG. 4 shows the result of confirming the gas generation from PEG 5000-octylcarbonate under a microscope. As shown in FIG. 4, it was confirmed that when the derivative powder was added to the DW, gas generation was observed.

(2) Introduction of Peptide (Ligand) into Polyethylene Glycol Derivative

The introduction of the peptide into the polyethylene glycol derivative was performed as follows.

First, an amino polyethylene glycol derivative having an amino group and a peptide were subjected to an EDC/NHS reaction in a molar ratio of 1:1 to prepare the polyethylene glycol derivative to which the peptide was bound. Thereafter, dialysis was performed for 4 days, impurities and unreacted substances were removed through a filter, and then freeze-drying was performed.

In the present invention, when an adipocyte-targeting sequence (ATS) peptide is used as the peptide, it may be expressed as ATS-PEG 5000-octylcarbonate depending on the type of peptide. The derivative contains the polyethylene glycol having the number average molecular weight of 5000 and uses octyl chloroformate.

(3) Preparation of Micelle Particle Using Solvent Evaporation

The micelle was prepared by solvent evaporation using a mixture solvent containing methylene chloride and acetonitrile in a ratio of 2:1.

After dissolving the polyethylene glycol derivative prepared in (1) above and/or the peptide-introduced polyethylene glycol derivative prepared in (2) above in the mixture solvent, the coating was performed on a glass surface using a concentrator (N-1300) in a vacuum at 180 rpm, 37° C. for about 5 to 10 minutes, and the derivative particle was coated on the glass surface (solvent evaporation).

After evaporation of the solvent, self-assembly was performed by adding a hydrophilic solution (including PBS and distilled water), and micelle was prepared.

In the present invention, four types of micelle particles were prepared according to the composition of the derivative used.

- micelle A (Non): the micelle prepared with the polyethylene glycol derivative prepared in (1)
- micelle B (9r): the micelle prepared with 2% by weight of 9r peptide-introduced polyethylene glycol derivative and 98% by weight of polyethylene glycol derivative
- micelle C (ATS): the micelle prepared with 2% by weight of ATS peptide-introduced polyethylene glycol derivative and 98% by weight of polyethylene glycol derivative
- micelle D (ATS/9r): the micelle prepared with 1% by weight of 9r peptide-introduced polyethylene glycol derivative, 1% by weight of ATS peptide-introduced polyethylene glycol derivative, and 98% by weight of polyethylene glycol derivative Experimental Example 1. Confirmation of Synthesis of Polyethylene Glycol Derivative It was confirmed whether the polyethylene glycol derivative prepared in (1) of Example 1 was synthesized, which was confirmed using FT-IR spectroscopy (Nicholet iS50, Thermo).

Whether the carbonate bond was introduced into the polyethylene glycol-alkyl carbonate was analyzed using the FT-IR spectroscopy, and as the result of analysis, the carbonate bonding group (C=O) was identified at wave numbers of 1742 $cm^{-1}$ and 1653 $cm^{-1}$, and thus, it was confirmed that a carbonate bond was introduced in the polyethylene glycol-alkyl carbonate (FIG. 5).

Experimental Example 2. Confirmation of Introduction of Peptide into Polyethylene Glycol Derivative It was confirmed whether the peptide was introduced into the peptide-bound polyethylene glycol derivative prepared in (2) of Example 1, which was confirmed using FT-IR spectroscopy (Nicholet iS50, Thermo).

As a result of analyzing the peptide introduction using the FT-IR spectroscopy, when the peptide was introduced, the primary amine ($NH_2$) pick was identified at 1650 to 1580 $cm^{-1}$ and the secondary amide (C=O) pick was identified at 1680 $cm^{-1}$ and 1760 $cm^{-1}$ (FIG. 6).

Experimental Example 3. Analysis of the Properties of Micelle Using Polyethylene Glycol Derivative The properties of micelles A to D prepared in (3) of Example 1 were analyzed.

The results are shown in Table 1 below.

TABLE 1

|  | Size (nM) | PDI | Potential (mV) |
| --- | --- | --- | --- |
| Non | 150.5 | 0.154 | −11.8 |
| 9r | 188.1 | 0.088 | −0.967 |
| ATS | 187.7 | 0.336 | −0.905 |
| ATS/9r | 179.1 | 0.136 | −0.720 |

As shown in Table 1, when the peptide was introduced, the size of the nanoparticle was increased compared to the micelle in which the peptide was not introduced (micelle A. Non). In addition, it was confirmed that the surface charge was increased by the introduction of the peptide.

Experimental Example 4. Confirmation of Gas Generation of Polyethylene Glycol Derivative Gas generation was confirmed in the polyethylene glycol derivative prepared in (1) of Example 1, which was confirmed through NMR analysis. Specifically, NMR of mPEG 5000 and a polyethylene glycol derivative was measured, and the NMR was re-measured 24 hours after storing the derivative in an aqueous solution.

As a result of analyzing the gas generation using the NMR, it was confirmed that the signal (—OH score) of the hydroxyl group of mPEG $_{5000}$ disappeared (4.56 ppm) after synthesis of the derivative, and when re-measured after storage in an aqueous solution, it was confirmed that the signal of the hydroxyl group was restored again around 4.56 ppm. Through this, the gas generation in the derivative was confirmed (FIG. 7).

Experimental Example 5. Confirmation of Gas Generation Rate of Polyethylene Glycol Derivative The gas generation rate in the polyethylene glycol derivative prepared in (1) of Example 1 was confirmed, which was confirmed through an ultrasonic device (SONON 300L). Specifically, the N gas generation rates of four types of polyethylene glycol derivatives: mPEG 2000-Butylcarbonate, mPEG 2000-Octylcarbonate, mPEG $_{5000}$-Butylcarbonate, and mPEG $_{5000}$-Octylcarbonate were identified.

As a result of analyzing the gas generation rate using the ultrasonic device, the gas generation rate differed depending on the type of derivative constituting the micelle, and it was confirmed that the micelle composed of mPEG $_{5000}$-Octylcarbonate exhibited the highest stability (FIG. 8).

In addition, the gas generation in the micelle composed of mPEG $_{5000}$-Octylcarbonate having high stability was confirmed with a fluorescence microscope.

As a result of confirming using the fluorescence microscope, it was confirmed that the gas was stably released from the micelle (FIG. 9).

Experimental Example 6. Cytotoxicity Analysis of Polyethylene Glycol Derivative The cytotoxicity of the polyethylene glycol derivative was analyzed, which was performed according to the MTS assay method.

3T3-11 cells were cultured or differentiated in a 96-well plate at $2\times10^3$ cells/plate, and treated with the micelle at the concentration of 0.5 mg/ml to 5 mg/ml. Then, the cells were incubated for 24 hours at 37° C. under 5% $CO_2$. The cultured cells were washed once with PBS, treated with MTS solution for 1 hour, and then absorbance analysis was performed at 490 nm through a UV/VIS spectrometer to confirm cytotoxicity.

The results were shown in FIG. 10.

As shown in FIG. 10, as a result of treating the adipocytes before and after differentiation with the polyethylene glycol-alkyl carbonate (mPEG $_{5000}$-Octylcarbonate) prepared in (1) of Example 1 of the present invention, there was little toxicity.

Experimental Example 7. Apoptosis Analysis of Adipocyte by Peptide-Introduced Micelle For the micelle prepared using the polyethylene glycol derivative into which a peptide (r9 peptide or ATS peptide) was introduced, the apoptosis ability of adipocytes according to the concentration of the peptide was analyzed. In this case, the amount of peptide introduced was 0% to 4% based on the total weight (weight) of the derivative.

The apoptosis ability was performed according to the MTS assay method.

3'T3-11 cells were seeded in a 96-well plate at $2\times10^3$ cells/plate, followed by differentiation for 2 to 3 weeks. Thereafter, the concentration of the derivative was 0.2% by weight, and after 24 hours, it was washed once with PBS. The absorbance was analyzed 1 hour after treatment with MTS solution (analyzed in the same manner as in Experimental Example 6).

The results were shown in FIG. 11.

As shown in FIG. 11, it was confirmed that the tendency of apoptosis appeared depending on the amount of the peptide introduced. However, in the case of the r9 peptide, it was found that the apoptosis effect was inhibited when the introduction amount was 4%.

Through this, it was confirmed that the appropriate concentration of the peptide-introduced derivative in the preparation of micelle for apoptosis of adipocytes was 1 to 3% by weight of the basic derivative.

Experimental Example 8. Adipocyte Ability According to Peptide Combination and Micelle Concentration For the micelles A to D prepared in (3) of Example 1, the micelles were treated at a concentration of 0.1 to 0.3% by weight to evaluate apoptosis ability.

In this case, ATS was for targeting adipocytes and 9r was used as a peptide for intracellular penetration.

The results were shown in FIG. 12. In FIG. 12, PEG $_{5000}$-octylcarbonate micelle denotes the micelle A, r9-PEG 5000-octylcarbonate micelle denotes the micelle B, ATS-PEG $_{5000}$-octylcarbonate micelle denotes the micelle C, and ATS-19-PEG $_{5000}$-octylcarbonated micelle denotes the micelle D.

As shown in FIG. 12, in the case of micelle A in which the peptide was not introduced, the cell viability was greater than 90%.

On the other hand, it was confirmed that the apoptosis effect increased as the concentration of peptide introduced-micelle increased. In particular, in the case of the micelle D, it was confirmed that the highest apoptosis result was seen at 0.3% by weight.

Experimental Example 9. Peptide Efficacy Confirmation

For the micelles A to D prepared in (3) of Example 1, the targeting orientation efficacy of the micelles in various cells (fibroblast, myoblast, adipocyte) was evaluated.

The results were shown in FIG. 13. In FIG. 13, control denotes the micellar A, r9 denotes the micelle B, ATS denotes the micelle C, and ATS/19 denotes the micelle D.

As shown in FIG. 13, the r9 peptide exhibited a similar apoptosis tendency regardless of the cell type, and the ATS peptide had a higher apoptosis rate in adipocytes than in other cells. The ATS/19 exhibited a higher apoptosis rate in adipocytes than in other cells, and exhibited a superior apoptosis rate than when ATS and r9 were used alone.

INDUSTRIAL APPLICABILITY

The gas-generating micelle for reducing fat according to the present invention can be prepared as an injectable preparation, and is applied to a cosmetic field for weight loss and an obesity treatment field so that it can be used as a lipolysis supplement for reducing localized fat, a body shape corrective or a cosmetic product for weight loss to decompose localized fat through the apoptosis of localized fat.

The invention claimed is:

1. A gas-generating micelle for reducing fat, comprising a compound represented by the following Chemical Formula 3,
   wherein the micelle is 150 to 500 nm in a diameter, and
   wherein adipocyte is destroyed by carbon dioxide generated by hydrolysis of the compound:

[Chemical Formula 3]

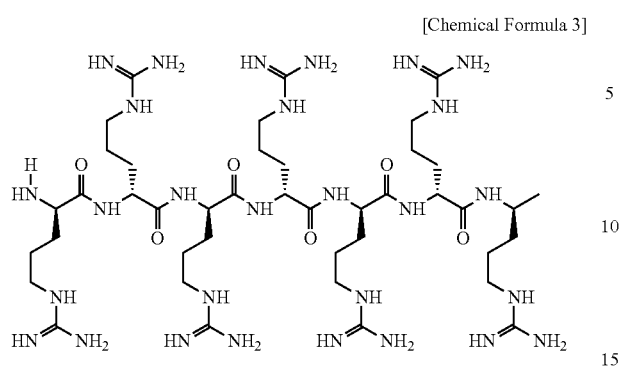

[Chemical Formula 4]

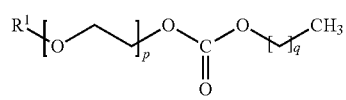

[Chemical Formula 3]

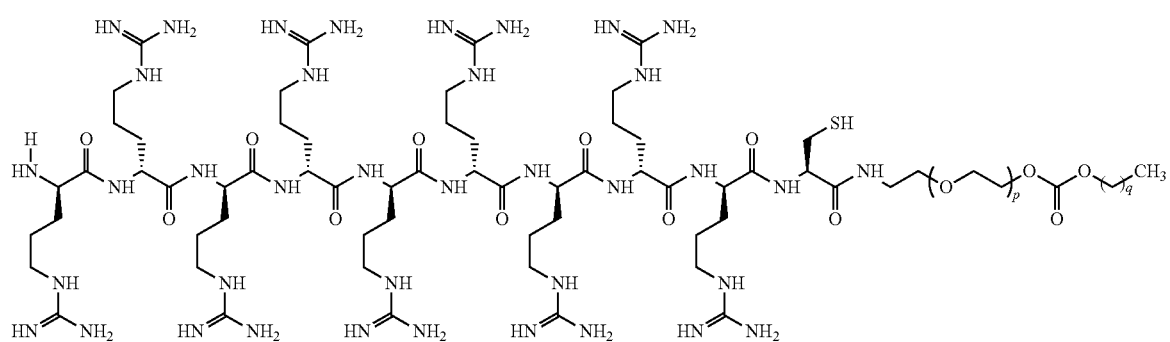

wherein in the Chemical Formula 3, p is an integer of 12 to 227, and q is an integer of 2 to 14.

2. A method for preparing a gas-generating micelle for reducing fat comprising a compound represented by the following Chemical Formula 3, wherein the micelle is 150 to 500 nm in a diameter, and the method comprises the steps of:

synthesizing a polyethylene glycol derivative that is a compound represented by Chemical Formula 4 by mixing polyethylene glycol and alkyl chloroformate;

synthesizing a peptide-bound polyethylene glycol derivative by binding one or more peptides selected from the group consisting of an adipocyte-targeting sequence peptide and an arginine 9 peptide to the polyethylene glycol derivative; and synthesizing a micelle by evaporating a solvent after dissolving the polyethylene glycol derivative and the peptide-bound polyethylene glycol derivative in one or two or more mixture solvents selected from acetonitrile, methylene chloride, chloroform and methanol:

wherein in the Chemical Formula 3 or 4, $R^1$ is a hydrogen, a C1 to C5 alkyl group, an amine group, a C1 to C5 alkylamine group, a carboxyl group, or a C1 to C5 alkylcarboxyl group, p is an integer of 12 to 227, and q is an integer of 2 to 14.

3. The method for preparing a gas-generating micelle according to claim 2, wherein the mixture solvent is a mixture solvent of the methylene chloride and the acetonitrile, and a mixing ratio is 3 to 1:1 to 3.

4. The method for preparing a gas-generating micelle according to claim 2, wherein a molecular weight (Mn) of the polyethylene glycol is 550 to 10000.

5. A composition for reducing fat comprising the gas-generating micelle for reducing fat according to claim 1.

6. The composition for reducing fat according to the claim 5, wherein the composition for reducing fat comprises the gas-generating micelle including at least one compound selected from the group consisting of a compound represented by the following Chemical Formula 3; and a compound represented by the following Chemical Formula 4:

[Chemical Formula 3]

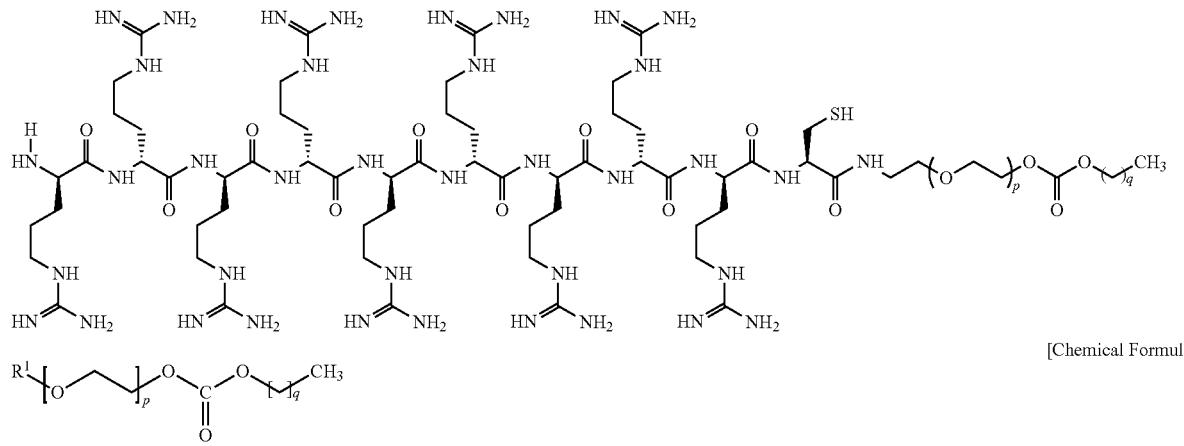

[Chemical Formula 4]

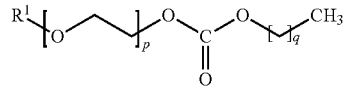

wherein in the Chemical Formula 3 or 4, $R^1$ is a hydrogen, a C1 to C3 alkyl group, an amine group, a C1 to C3 alkylamine group, a carboxyl group, or a C1 to C3 alkylcarboxyl group, p is an integer of 12 to 227, q is an integer of 2 to 14.

7. The composition for reducing fat according to claim 6, wherein when the composition for reducing fat comprises the gas-generating micelle including the compound represented by Chemical Formula 3 and the compound represented by Chemical Formula 4, a molar ratio of the compound represented by Chemical Formula 3 and the compound represented by Chemical Formula 4 is 99.5:0.5 to 95.0:5.0.

8. The composition for reducing fat according to claim 5, wherein the composition is used for topical or intravenous injection.

* * * * *